United States Patent
Tsukamoto et al.

(10) Patent No.: US 6,570,569 B1
(45) Date of Patent: May 27, 2003

(54) IMAGE PROCESSING DEVICE AND IMAGE PROCESSING METHOD

(75) Inventors: Masanobu Tsukamoto, Yokohama (JP); Makoto Hara, Tokyo (JP); Masayoshi Matsuyama, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/413,855

(22) Filed: Oct. 7, 1999

(30) Foreign Application Priority Data

Oct. 8, 1998 (JP) .......................................... 10-287103

(51) Int. Cl.$^7$ .............................................. G06T 17/00
(52) U.S. Cl. ...................................................... 345/473
(58) Field of Search ................................. 345/473, 474, 345/475, 418

(56) References Cited

U.S. PATENT DOCUMENTS 4,905,168 A * 2/1990 McCarthy et al. .......... 345/473
5,680,531 A * 10/1997 Litwinowicz et al. ....... 345/473

* cited by examiner

Primary Examiner—Cliff N. Vo
(74) Attorney, Agent, or Firm—Finnegan, Henderson, Farabow, Garrett & Dunner, L.L.P.

(57) ABSTRACT

A realistic image of buildings collapsing, as in a monster movie, is displayed. Each of the display blocks to be scattered after the collapse is previously set as collective movable display elements (1~29), and objects (OBJ) simulating buildings and the like composed of display elements are structured and displayed. By separating the display elements, it is possible to create an image similar to concrete blocks after as actual collapse. Further realism is provided by changing the way the blocks fall upon a collapse of a building.

22 Claims, 14 Drawing Sheets

IMAGE PROCESSING DEVICE AND IMAGE PROCESSING METHOD

BACKGROUND OF THE INVENTION

1. Field of the Invention

The present invention generally relates to image processing technology to be employed with so-called 3D game devices and action puzzle games, and particularly relates to the improvement in image processing devices for displaying realistic scenes of structures such as buildings being destroyed.

2. Description of the Related Art

A typical 3D game device is capable of displaying numerous objects (an aggregate of bitmaps displayed on the screen; hereinafter referred to as "object") arranged in a three-dimensional virtual apace. Buildings and game characters (hereinafter referred to as "character"), for example, are displayed as objects, and by changing the display position of these objects in vertical synchronization units, a moving image simulating battle scenes in the city can be displayed.

Conventionally, as a building object had the likes of a simple cube shape, texture mapping was performed by applying a single polygon to each of the walls of such building. When the building object and another object (bullet, character, etc.) collide, images suggestive of an explosion such as a flash, flame, and smoke are displayed at the collision point. With respect to the display of the building object after the collision, the same image prior to the collision without making any changes to the building itself is displayed, or a previously prepared image of the building object after the collapse is displayed.

Moreover, restrictions were sometimes added to the range is which the "character") is able to move. This was in order to prevent the display of arena is which buildings were not established when a character approaches an area where the building object was established. For example, by displaying walls of buildings or rivers, or by making the operation impossible, characters could not proceed any further.

One purpose of a game, however, is to have the player experience an invigorating feeling, and it is important to realistically express pictures of the collapse or explosion of objects. In a game share a monster is rampaging in a city, for example, an important factor in determining the value of a game is how the monster destroys the buildings. In other words, it is preferable that the buildings is destroyed realistically as though watching a scene from a monster movie. If no change is made to the building or the destroyed condition of such building is suddenly displayed as in conventional game devices, the resulting image becomes dull and unattractive.

In this type of game, there are also demands of producing a gruesome feeling in which a monster destroys buildings one after another. The distinctive feature is that the monster wrecks any and all buildings in its path. Therefore, the amusement is diminished when adding restrictions to the operation for the range in which the character, i.e., the monster may move as in conventional game devices.

Further, when this type of monster object is attacked, it is preferable to reflect the degree of damage to the monster's posture and to display an image as though a living creature is actually injured.

In view of the foregoing problems, the inventors of the present invention have arrived at this invention with as object of displaying images, as though a monster movie, in a realistic manner.

SUMMARY OF THE INVENTION

Accordingly, an object of the present invention is to provide image processing technology capable of destroying objects such as buildings in a realistic manner.

Another object of the present invention is to provide image processing technology capable of naturally restricting the range in which the character may move.

Still another object of the present invention is to provide image processing technology capable of expressing the degree of damage to the character in a realistic manner.

The present invention is an image processing device for displaying a moving image of an object collapsing, wherein the image processing device sets in advance each of the display blocks to be scattered after the collapse as collective movable display elements, structures an object with the display elements, and displays such object. Here, "object" shall include displayed images such as models, characters and segments, still life such as buildings and landforms, and living/nonliving objects with motion such as fighter planes, monsters, people, robots and cars. "Collapse" shall mean the transition of a single object into a plurality of parts or a smaller shape, and includes situations of simulating physical phenomenon such as collisions in the virtual space as well as changing the form by oneself with settings ouch as earthquakes and suicidal explosions. "Scattering" shall include situations of each of the display elements being separated from each other, as well as situations where a plurality of display elements move without separating, and detach from other display elements. A group of display elements that separate collectively can be further collapsed. The display elements, for example, are set to shapes simulating block clods created upon an actual collapse of a building.

When each of the display elements approaches a specific object within a predetermined distance, such display element may be erased. "(Approach) within a predetermined distance" is a concept including contact. When a certain display element is erased, an image of a display element positioned directly thereabove falling at a prescribed speed may be displayed. Here, "directly thereabove" and "falling" are definitions of directions along the virtual gravitational direction set forth in the virtual space for reasons of convenience.

When a certain display element is erased, an image of a display element adjacent thereto moving at a speed in accordance with the intensity of the impact inflicted upon the object may be displayed. Here, "impact" shall mean the virtual external force inflicted upon the object or display element for reasons of convenience, and is specified by defining the strength and direction of the external force.

When a certain display element is erased, an image of a display element adjacent thereto moving in a direction in accordance with the direction of the impact inflicted upon the object may be displayed. Here, "adjacent" shall include cases where a display element is in contact with a side of one part of a display element as well as being within a prescribed distance from the side or center of gravity of a display element.

When a certain display element is erased, an image of a display element adjacent thereto rotating at a rotation speed in accordance with the size of the display element may be displayed. Here, "rotation" shall mean rotating around the rotation axis defined within the virtual space appropriately set forth in the display element.

When the intensity of the impact inflicted upon the object exceeds a prescribed value, the display position of the image of the display element adjacent to the erased display element map be changed. In addition, whey a certain display element is erased and therefore the remaining display elements are arranged in a horizontal row and supporting the object in a virtual space, and when the number of supporting display elements are less than a prescribed number, an image of these display elements and/or the display elements supported thereby falling at a prescribed speed may be displayed. Here, display elements "supporting the object" shall mean those display elements structuring the neck portion of a constriction part of a display element, which has changed in comparison to the original shape, upon a part of the object collapsing.

When another impact is to be inflicted upon a part of the object remaining without being erased during or after the fall, a display element structuring a part of the object may be farther erased, moved, or rotated. In other words, additional second and third attacks may be made to the blocks that have collapsed after the first attack. When the display element structuring the object is separated with the whole or part thereof remaining upon the infliction of an impact, these display elements are erased. That is, the display elements are erased after being determined that the display elements have separated.

The present invention is an image processing device capable of displaying a movable character within a virtual space, wherein when the character goes out of the area set in the virtual apace, the image processing device displays a uniformly changing image of the degree of brightness and/or color of the picture element displaying the character. Here, it is preferable that the degree of brightness and/or color of the picture element be changed in accordance with the distance between the character and the boundary of the area. It is further preferable that it is structured to be capable of performing completion processing when the time in which the character is out of the area reaches a prescribed time.

The present invention is an image processing device capable of displaying a movable character in a virtual space, wherein when it is determined that a character collided with another object, the image processing device displays an image of a change in the character's posture until a prescribed condition is fulfilled. Hare, it is preferable that the character's posture be a posture protecting the point of collision. Here, a prescribed condition is the character making a predetermined motion, and a prescribed condition is the lapse of the predetermined time.

The present invention is an image processing method for displaying a moving image of an object collapsing, wherein the image processing method sets in advance each of the display blocks to be scattered after the collapse as collective movable display elements, structures an object with the display elements, and displays such object.

The present invention is an image processing method capable of displaying a movable character within a virtual space comprising the steps of determining whether or not the character has gone out of the area set in the virtual space, cad displaying as image of the degree of brightness and/or color of the picture element displaying the character being changed uniformly when the character goes out of the area set in the virtual space.

The present invention is an image processing method capable of displaying a movable character within a virtual space comprising the steps of determining whether or not the character collided with another object, determining whether or not a prescribed condition has been fulfilled when it is determined that the character has collided with another object, and displaying an image of a change in the character's posture when the condition is not fulfilled.

The present invention is a machine-readable recording medium storing a program for making a computer execute the aforementioned image processing method. Here, "recording medium" shall mean any physical means storing information (mainly digital data, programs) and capable of making processing devices such as computers and dedicated processors perform prescribed functions. In other words, any means capable of downloading a program to the computer and making it perform prescribed functions will suffice. Examples of such medium include flexible disc, secured disc, magnetic tape, optical magnetic disc, CD, CD-ROM, CD-R, DVD-RAM, DVD-ROM, DVD-R, PD, MD, DCC, ROM cartridge, RAM memory cartridge with battery backup, flash memory cartridge, non-volatile RAM cartridge, and so on. This includes asses when receiving data transmission from a host computer via a wire- or wireless-communication circuit (public circuits, data dedicated lines, satellite circuits, etc.). The so-called Internet is also included in the recording medium mentioned above.

DESCRIPTION OF THE PREFERRED EMBODIMENT

The preferred embodiment of the present invention is hereinafter described with reference to the relevant drawings.

(Structure)

Figure 1:
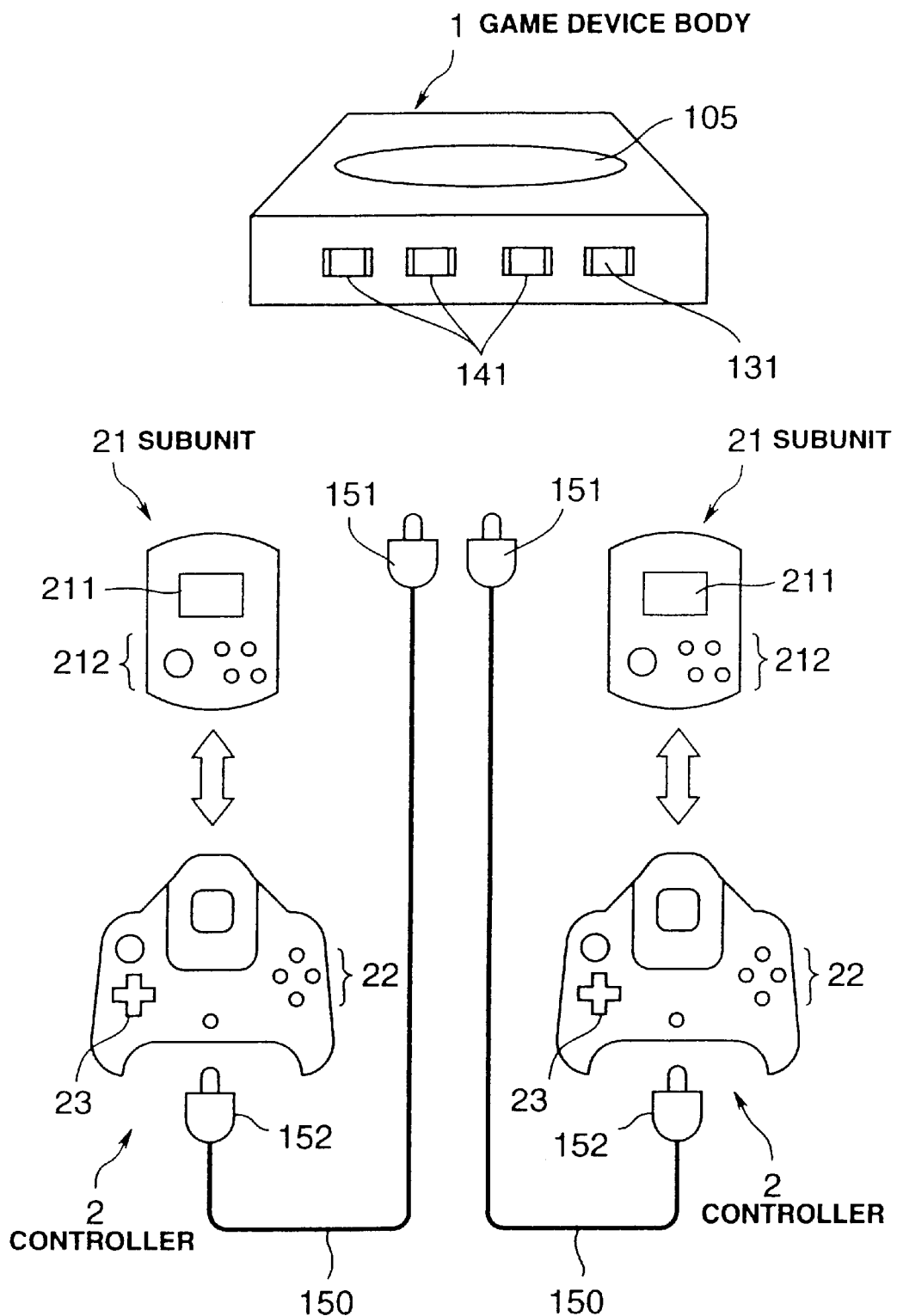
FIG. 1 is a conceptual diagram of the connection of the game device in the present embodiment.

FIG. 1 is a conceptual diagram of the connection of a game device employing the image processing device in the present embodiment. This game device is structured by mutually connecting a game device body 1 and a controller 2.

The game device body 1 is the main controlling device for managing the game progress. The game device body 1 is capable of connecting a plurality of controllers 2, and thereby comprises a plurality of connectors 141 and a modular jack 131 for a communication circuit. The game device body 1 further comprises a CD-ROM holder 105 and is capable of freely installing/removing a recording medium such as a CD-ROM. The controller 2 is structured as an operation portion for each of the players to operate, and comprises an operation button group 22, a cross-shaped key 23, and a connector for connection with the game device body 1. The controller 2 further comprises a slot for freely installing/removing a sub-unit 21. The sub-unit 21 is for displaying a sub-image display and for a player to play a sub-game, and comprises a sub-monitor 211, an operation button group 212, end a connector for connection to the slot of the controller 2. A connection cable 150 comprises connectors 151 and 152, and in capable of mutually connecting the game device main body 1 and the controller 2. The video signal output and audio signal output of the game device bode are, for example, output to a TV device.

Figure 2:
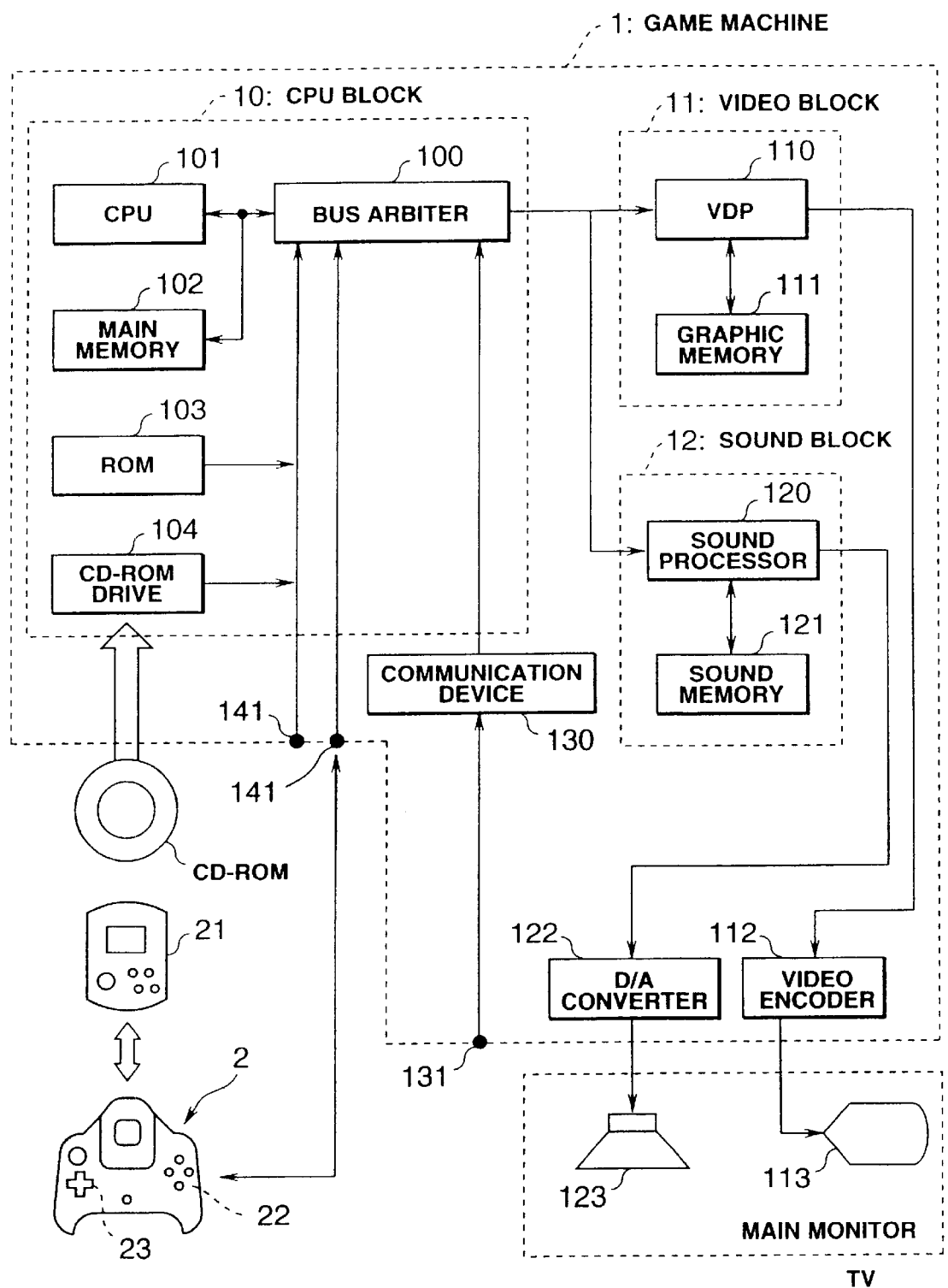
FIG. 2 is a block diagram of the game device in the present embodiment.

FIG. 2 shows a block diagram of the present game device. The game device body 1, as shown in FIG. 2, comprises a CPU block 10, a video black 11, a sound block 12 and so on.

The CPU block 10 comprises a bus arbiter 100, CPU 101, main memory 102, ROM 103 and CD-ROM drive 104. The bus arbiter 100 is capable of controlling data transmission/reception by assigning a bus-occupancy time to the mutually connected devices via a bus. The CPU 101 is capable of accessing the main memory 102, ROM 103, CD-ROM drive 104, video block 11, sound block 12 and, via the controller 2, sub-unit 21. The CPU 201 implements the initial program stored in the ROM 103 upon the power source being turned on and performs initialization of the entire device, When the CPU 101 detects that a CD-ROM has been installed into the CD-ROM drive 104, it transfers the program data for the operating system stored in the CD-ROM to the main memory 102. Thereafter, the CPU 101 operates is accordance with the operating system and continues transferring the program of the image processing method of the present invention stored in the CD-ROM to the main memory 102 and implements such program. In addition, the CPU 101 transfers the image data for image processing of the, present invention to a graphics memory 121, and is capable of transferring audio data to the sound memory 121. The program processing implemented by the CPU 101 are, for example, input of operation signals from the controller 2 or communication data from a communication device, command output to the sub-unit 21 based on such signals and data, control of the image output to be performed by the video block ii and control of audio output to be performed by the sound block 12.

The main memory 102 mainly stores program data and programs for the aforementioned operating system and is also capable of providing a work area for storing the likes of static variables and dynamic variables. The ROM 103 is a storage region for an initial program loader. The CD-ROM drive 104 is structured such that a CD-ROM is freely installable/removable, outputs data to the CPU 141 notifying the installation of a CD-ROM, and is capable of data transfer by the control of the CPU 101. The CD-ROM stores a program for making the game device implement the image processing method of the present invention, image data for displaying images, dad audio data for audio output. The recording medium in not limited to a CD-ROM, and may be other various recording mediums structured to be readable. The data group stored in the CD-ROM may be transferred to each memory via the communication device 130. By this, data transfer from a secure disc of a distant server is possible.

The video block 11 comprises a VDP (Video Display Processor) 110, graphic memory 111, and video encoder 112. The graphics memory 111 comprises a storage region of image data read from the CD-ROM and a frame memory region. In the image data storage region, stored collectively in object units is polygon data for prescribing each of the vertex coordinates of polygons for displaying an object in a virtual space. The present invention is characterized in the special setting to the polygon data for displaying buildings as objects, which will be explained in detail later. The VDP 110 refers to a portion of the image data stored in the graphite memory 111 based on the control of the CPU 101, generates bitmap data, and stores this in the frame memory region. As information necessary for displaying images supplied from the CPU 101, there is command data, viewpoint position data, light source position data, polygon designation data, object designation data, polygon position data, polygon method data, texture designation data, texture density data, visual field conversion matrix data, and so on. Based on this information, the VDP 110 is capable of implementing coordinate conversion (geometry operation) to polygons, texture mapping processing, display priority processing, shooting processing, and the like. The video encoder 112 converts the image data generated by the VDP 110 to a prescribed video signal such as an NTSC format, and outputs this to the main monitor 113 of the TV device connected externally.

The sound block 12 comprises a sound processor 120, sound memory 121, and D/A converter 122. Stored in the sound memory 121 is audio data read from a CD-ROM as mentioned above. The sound processor 120, based on command data supplied from the CPU 101, reads audio data such as waveform data stored in the sound memory 121 sad performs various effects processing pursuant to the DSP (Digital Signal Processor) function and digital/analog conversion processing. The D/A converter 122 converts the audio data generated by the sound processor 120 into analog signals and outputs these to the speakers 123 of the TV device connected externally.

The communication device 130 is, for example, a modem or a terminal adapter, and functions as an adapter that connects the game device body 1 and external circuits. The communication device 130 receives data transmitted from a game-supplying server connected to a public circuit network, and supplies this to the bus of the CPU block 10. The public circuit network includes, but is not limited to, a subscriber circuit and dedicated line, regardless of it being a wire system or a wireless system.

The controller 2 periodically converts the operation situation of the operation button group 22 and cross-shaped key 23 into codes and transmits these codes to the game device body 1. The operation signals from each of these controllers 2 are used to move the respective characters displayed in the game. The sub-unit 21 is structured as a computer device comprising an independent CPU and memory so as to be able to operate as independent game, end stores setting data including settings each as the game progress, game scores and operation methods arising during a game. Setting data transmitted from the game device body specifying the game processing situation may be stores in the sub-unit 21. This setting data is transferred to the game device body as backup data for restarting the game from the condition prior to shutting down the power source when the power source is to be shut down. By exchanging the sub-unit, such exchanged sub-unit becomes the data reflecting the operation situation of another game device in the game devise concerned.

(Operation)

Next, the operation of the game device is explained. In this game, a moving monster is displayed as a character. When the monster's body collides with a building, which is a structural object, a part or whole of the building collapses. The player operates the movement of the monster and destroys the buildings one after another by making the monster's tail, head or body hit the building and by firing laser beams at the building. The game device evaluates the game by giving scores for the method of destruction.

Collapse Processing

Figure 6:
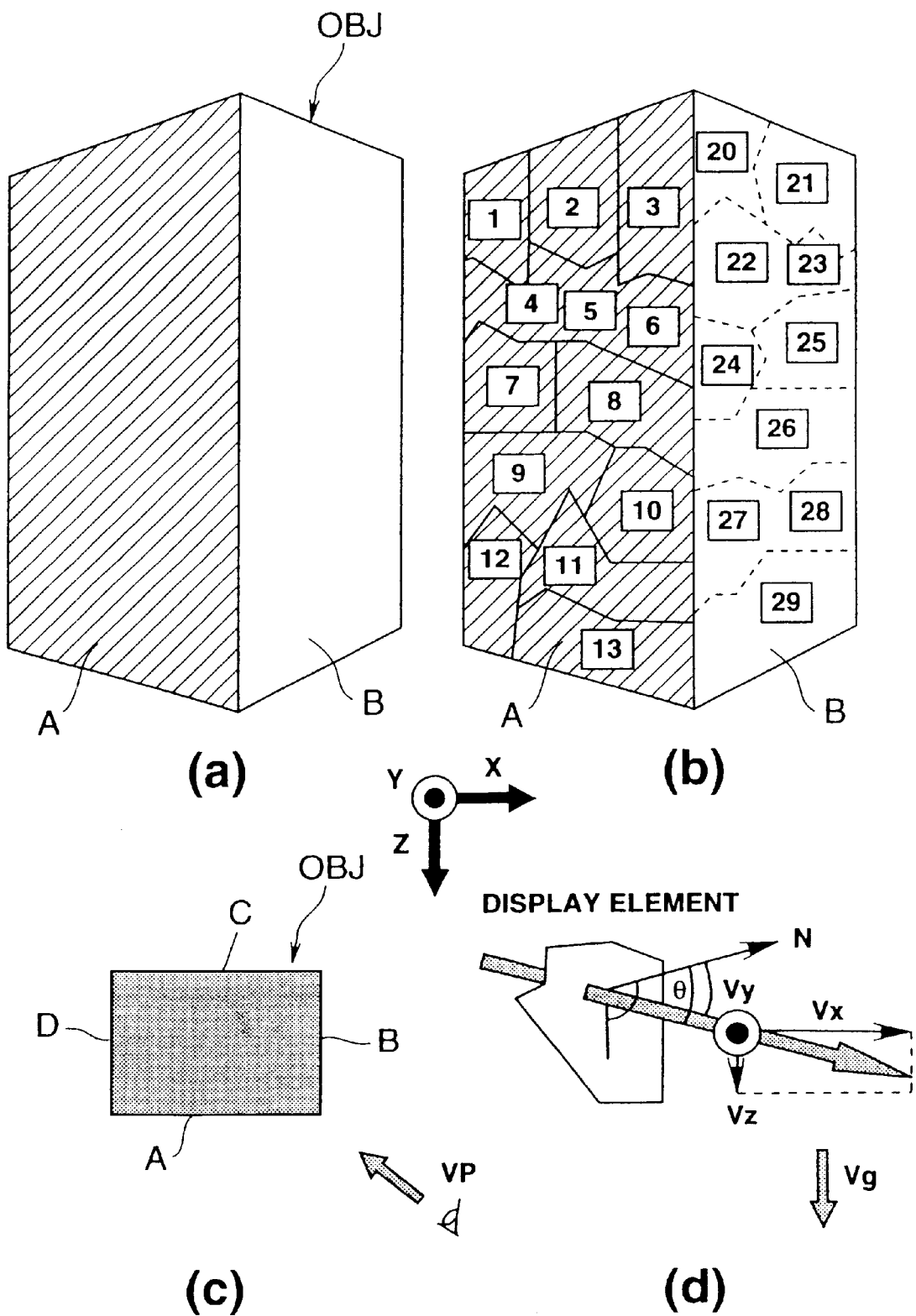
FIG. 6 is a conceptual diagram of the display of the building object in the present embodiment.

The constitution of the structural object is the present embodiment is foremost explained with reference to FIG. 6. FIG. 6(c) is a plane view showing the relation of the object and viewpoint arranged in the virtual space. The object OBJ is formed in a shape simulating a building and comprises four walls A, B, C and D. View point VP is a viewpoint of a three-dimensional image for viewing this abject OBJ. FIG. 6(a) is an example of the object OBJ actually being displayed on the monitor 11. The walls A and B facing the viewpoint side have texture data mapped thereon to give a realistic image of a building. FIG. 6(b) shows is dashed lines the display elements structuring this object OBJ. Wall A is structured of display elements 1~13 and wall B is structured of display elements 20~29. Walls C and D, not displayed, are also respectively structured of an aggregate of display elements (30~39 for Wall C and 40~49 for Wall D). In the present embodiment, display elements are treated synonymously as a polygon, which is the minimum display wait. Display elements, however, may also be sat as a group of polygon data structured to be simultaneously movable by a plurality of polygons. In any case, unlike the ordinary simple triangular or quadrilateral polygons, a plurality of vertexes are establishes in order to realize a complex outline. The shape of the display elements is set to be as though a rugged broken surface to simulate block clods created upon the actual collapse of a building. A display of a collapsed building is obtained by merely separating the display elements. These display elements may also be divided into blocks per group of a plurality of adjacent display elements. The display elements divided into blocks are capable of moving without being separated per block The coordinate direction seen from the viewpoint, as coordinate axis X, Y and Z shown in FIG. 6, is set forth below.

The CPU block 10 transfers to the video block 11 object designation data for designating the object OBJ, polygon designation data for designating polygons to be displayed, polygon position data for designating the position of sack polygon in a world-coordinate system, polygon direction data for designating the normal line direction of each polygon, and texture designation data for designating the viewpoint position data of the viewpoint VP and texture data to be mapped onto each polygon. The video block 11 specifies the polygon data group of the object OBJ to be displayed by the polygon designation data, and extracts polygon data to be displayed by the polygon designation data. And pursuant to the viewpoint position data and polygon. Position data, the video block 11 performs perspective conversion on the vertex coordinates of each polygon and performs mapping of texture data onto each polygon. By this as image of an object OBJ is displayed as though viewing an actual building from a specific viewpoint.

When erasing a specific display element upon collapsing a building, the CPU block prohibits the transfer of polygon designation data for specifying the display element to be erased. When dropping a specific display element, the CPU block calculates the direction and rotation speed of the drop based on the intensity and direction of impact inflicted upon such display element. And by changing the polygon position data and polygon direction data of the display element per frame displaying period, the CPU block displays a display element as though it is falling while rotating.

Figure 3:
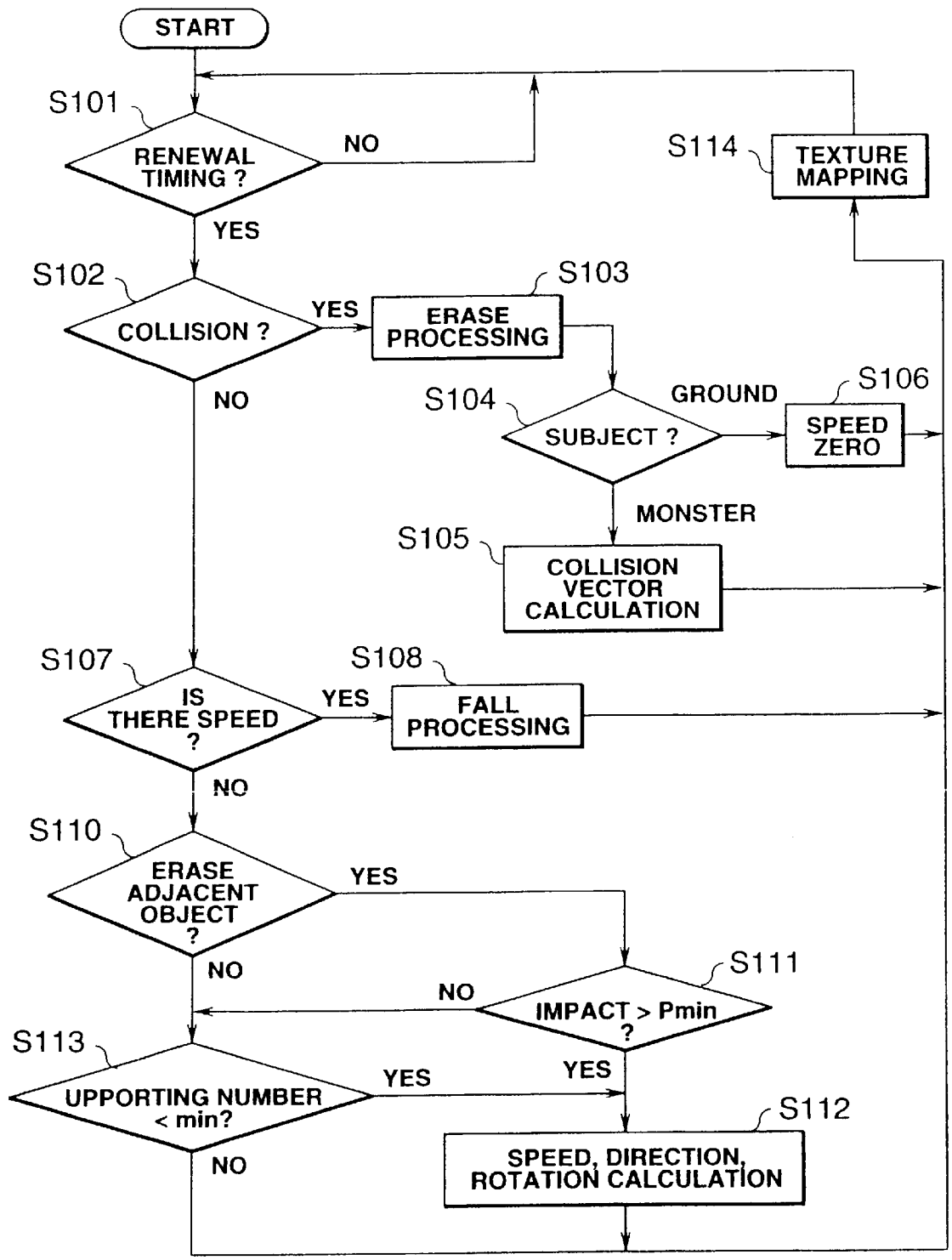
FIG. 3 is a flowchart explaining the method of displaying buildings in the present embodiment.

Next, the collapse processing method of the object is explained in detail with reference to the flowchart shown is FIG. 3. This flowchart is the processing for a single display element or a block including such display element. The same display processing is performed with respect to the other display elements and blocks.

The renewal of frame image data is conducted per frame displaying period. The CPU block 10 awaits this renewal timing (S101, NO), and performs collision judgment (S102) when it is the timing of generating a new image (S101, YES). Known art is used for this collision judgment. In other words, a collision circle with a prescribed radius is established on each of the display elements of the structural object OBJ and/or the monster. And when the distance between the center of both collision circles come within the sum of the radius of both collision circles, judgment of collision is made. When a collision is confirmed as a result of the collision judgment (S102, YES), the CPU block performs erase processing to the display elements that have collided (S103). Erase processing is completed when the CPU block prohibits the transfer of polygon designation data for designating the display elements. Situations of the display elements being erased are, for example, when the monster contacts the display element and when the falling display element lands on the ground. If colliding into a monster (S104, Monster), the CPU block generates the collision vector I for deciding the intensity of impact and direction thereof (S103). The collision vector may be set optionally. For example, when the monster's tail or laser beam bits an object, the collision vector may be set in correspondence with the direction of incidence and the moving speed. A single collision vector common with such of the display elements structuring the object is set. In order to realize an atmosphere of an internal explosion of a building, a collision vector directed outward may be set to each of the walls A~D of the object OBJ irrelevant to the collision of the monster. A separate collision vector may be set to each of the display elements.

If the subject of collision is the ground (S104, Ground), it is necessary to suspend the movement of display elements that fell together with the erased display elements but are still displayed since they have not directly landed on the ground. Thus, the CPU block resets data of the falling speed and rotation speed set to the group of display elements in the midst of the tell (S106). When landing on the ground, it is possible to set is advance the number of displayable display elements and, when a number of display elements exceeding such number lands on the ground, erase the display elements at random.

Contrarily, if the display element did net collide with either the monster or the ground (S102, NO), the CPU block judges whether the moving speed and rotation speed have bees set (S107). if some type of speed has been set (S107, YES), it means that the display element is falling and therefore the falling processing is performed (S108). Details of the falling processing are explained at S112.

If no speed has been set to the display element (S107, NO), this display element is considered to not have directly contacted the monster and therefore does not fall. In the present embodiment, however, to realize a realistic picture, when a certain display element is erased, a picture of the display element adjacent thereto scattering in accordance with the intensity of impact is displayed. Therefore, when a judgment is made of the display element to be erased (S110, YES), the CPU block refers to the size of the impact vector set at step S105 and judges whether the intensity of impact is larger than the minimum value Pmin (S111). If larger (S111, YES), the CPU black calculates the movement speed, movement direction, rotation direction, rotation speed, and so forth of the parameter for displaying an image of this display element falling while rotating (S112).

When a center portion of as object is destroyed, displayed is a large clod of the upper part being supported by a part of the display element. In the present embodiment, in order to reproduce a some of a building naturally collapsing upon becoming unbearable to the weight is such a case, the entire building collapses or remains in accordance with the number of display elements supporting the building. Thereby, eves if the intensity of impact of the monster is smaller than the minimum value Pmin (S111, NO), the aforementioned parameter calculation (S112) is performed when the number of display elements supporting the object becomes less than a prescribed value min (S113, YES) with respect to the display elements on the same XY plane. This parameter is calculated respectively for the supporting display elements and the overall block of the remaining display elements collectively displayed thereabove. By this, it in possible to display an image of a building collapsing naturally in which only a small section of the blocks are remaining.

The parameter group calculated at atop S112 is used for the actual coordinate position calculation of the display elements at step S108. That is, the CPU block calculates a new falling position and rotation angle per image renewal period. The CPU block completes the bitmap data by mapping texture data with respect to the display elements decided by the vertex coordinates (S114).

FIG. 6(d) shows an explanatory diagram of these parameters set for a single display element. For each display element, a normal line vector N is set. The movement direction of this display element is initially the direction of the collision vector X set for the display element, and speeds Vx, Vy and Vz corresponding to the respective coordinate components are set. A gravity speed component Vg is added to the Z axis component in order to reproduce a picture of the gravity working. By this setting, it is possible to display an image of a block falling is accordance with gravity. The speed setting, however, is optional. Even if setting the movement position in accordance with the acceleration speed, the collision vector may be irrelevantly set. If a block is structured from a plurality of display elements and the display elements within the block are intact, a single movement speed may be calculated for such block and the block may be dropped as one body.

The rotation is set in accordance with the relation between the collision vector I and normal line vector N. Larger the angle θ of the normal line vector N and collision vector I, the faster the rotation speed set by the CPU block. If the blocks rotating are set to simultaneously move without separating, the rotation speed may be set in accordance with the number of display elements constituting the block. For example, by setting such that larger the block slower the rotation and smaller the block, faster the rotation, it is possible to express a realistic collapse conforming to physical laws. The rotation direction may be set to either positive or negative in the plane including the normal line vector N and collision vector I. It is also possible to set the rotation direction in owe direction irrelevant to the vector. It is further possible to set the rotation direction in accordance with the position relation of the display element and collision point. For example, the rotation direction of the display element on the collision point may be set opposite to the rotation direction of the display element thereunder.

Figure 7:
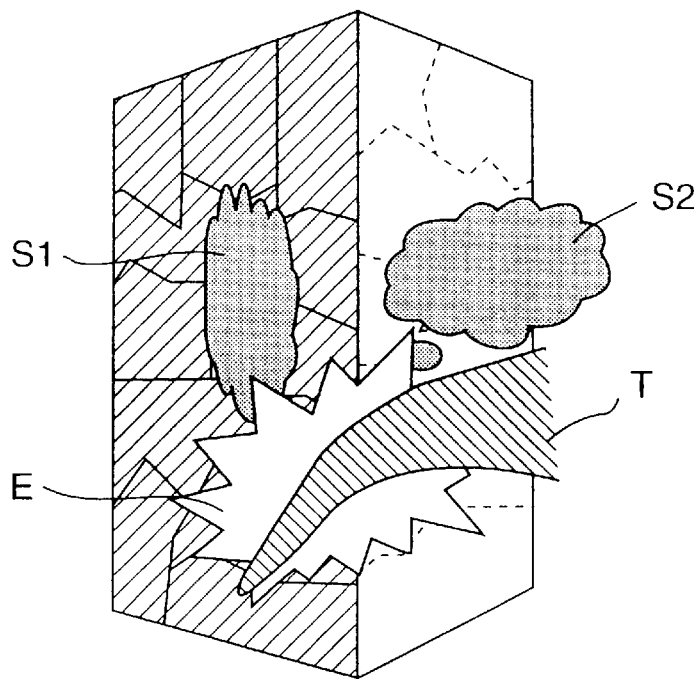
FIG. 7 is a conceptual diagram of the display upon the collision of a building object.

FIGS. 7 through 14 show display examples of the collapse of the structural object pursuant to the aforementioned processing. FIG. 7 in an image display example immediately after it has been judged at step S102 that the tail T of the monster has collided with the structural object OBJ shown in FIG. 6. An object E showing a flash and objects S1 and S2 showing powder smoke at the moment of collision are displayed.

Figure 8:
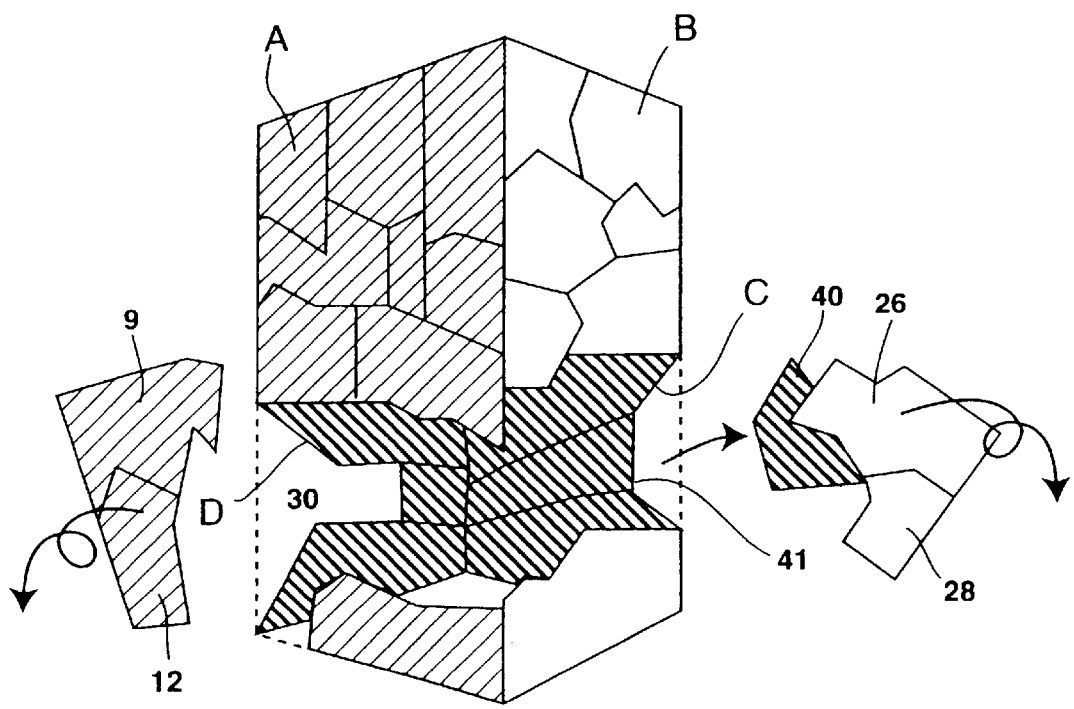
FIG. 8 is a first conceptual diagram of the display upon the collapse of the building object.

FIG. 8 is an image display example where directly colliding display elements at step S103 are erased and the display elements adjacent thereto are starting to fall. Display elements 10, 11 and 27 are being erased upon directly colliding with the monster. As the size of the collision vector is larger than the minimum value Pmin (S110, YES, S111, YES) regarding display elements 9, 12, 26, 28 and 40 adjacent to the erased display elements upon collision, they are starting to move and rotate (S108) as the display position is changed based on the calculated parameter. It is also possible to set the connection relationship of the display elements to move without separating as in display elements 9 and 12 and display elements 26 and 28.

Figure 9:
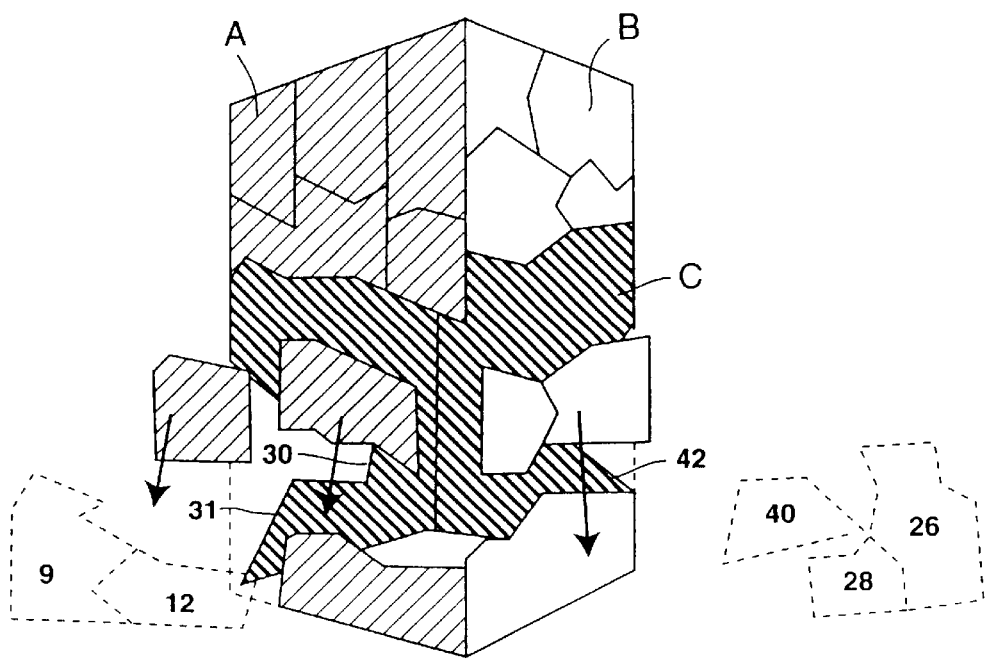
FIG. 9 is a second conceptual diagram of the display upon the collapse of the building object.

FIG. 9 is an image display example of the display elements directly above and adjacent to the erased display elements collapsing. Display elements 1, 12, 26, 28 and 40 which have fallen are erased at step S103 since they have hit the ground. Display elements 7, 8, 24 and 25 are newly starting to fall based on the calculated parameter at step S112. Display elements which are no longer supported as the display elements directly therebelow have been erased may be set to fall irrelevant to the parameter calculation (S112).

Figure 10:
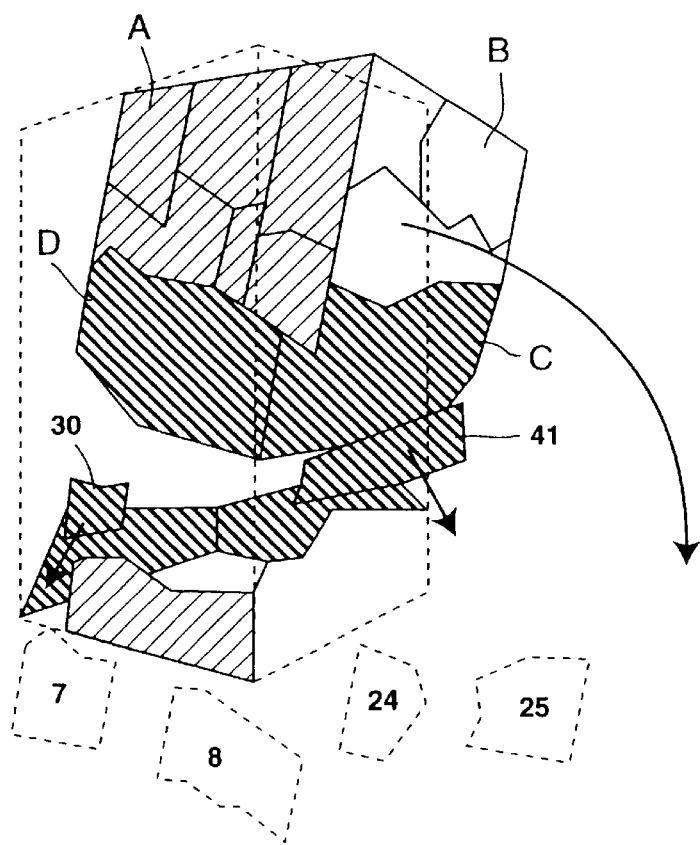
FIG. 10 is a third conceptual diagram of the display upon the collapse of the building object.

FIG. 10 is an image display example where the entire structural object is starting to fall since the supporting display elements are few. In this object OBJ, the upper object is only supported by two display elements 30 and 41, and it is judged at step S113 that it will not hold and begins rotating and falling based on the parameter calculated at S112. With respect to display elements 30 and 41, they are independently falling based on a separately calculated parameter since a display element group is not formed. A single parameter is calculated with the whole thereof considered as a single object regarding the display element group that was on these display elements and start falling pursuant thereto. Display elements 7, 8, 24 and 25 which fell first have been erased at step S103 since they hit the ground.

Figure 11:
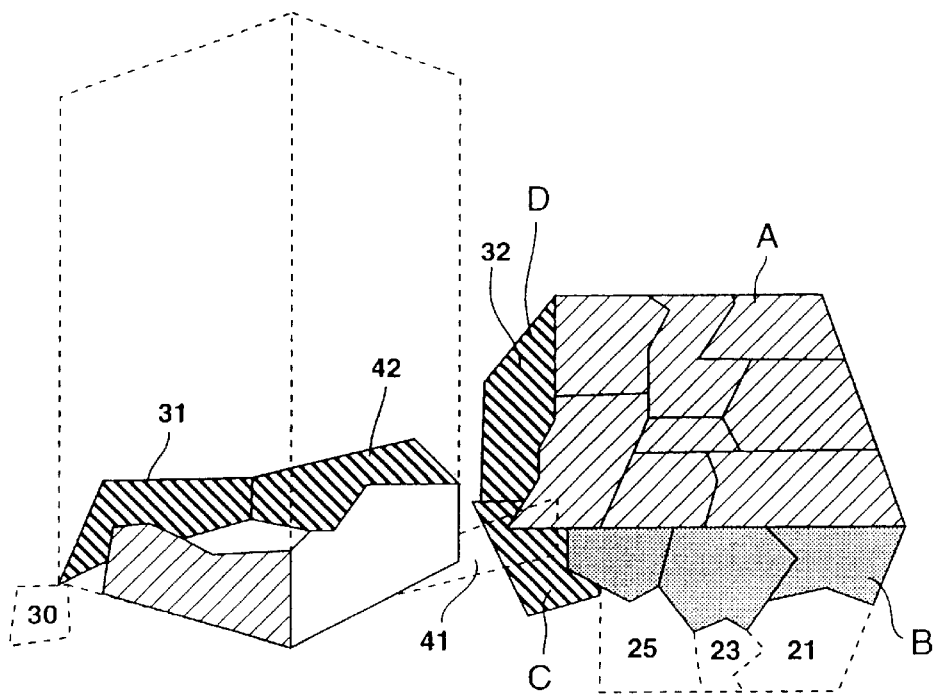
FIG. 11 in a conceptual diagram of the display upon completion of the collapse (first collapse) of the building object.

FIG. 11 is a final image display element of the upper object which collectively collapsed and landed on the ground. Display elements 30 and 41 which were supporting the upper object have hit the ground and disappeared. The upper objects which collectively collapsed have landed on the ground as well, but only display elements 21, 23 and 25 that are in direct contact with the ground are erased at step S103. Although not erased, as the movement parameter has been reset at step S106 with respect to the remaining display elements, a part of the collapsed object is still, and is displayed as the remains of the building which hit the ground. The first collapse is thus completed.

Figure 12:
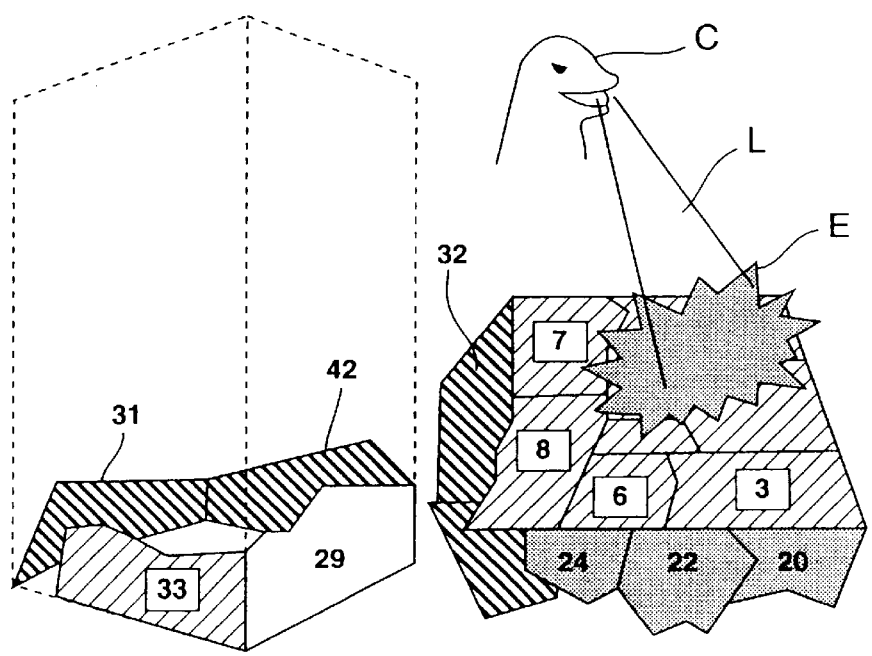
FIG. 12 is a conceptual diagram of the display upon a second attack on the building abject.

FIG. 12 is an image display example when a second attack is made to a part of the collapsed object. In the present embodiment, an object is continuously displayed unless such object directly hits the ground or becomes a minimum unit, in other words an individual display element, which is completely separated and cannot be separated any further. Therefore, it is possible to attack or carry and throw a part of the object that fell and is on the ground due to the first attack. The laser beam L fired by the monster C is hitting a part of the collapsed object. In other words, the object expressing the laser beam L is colliding with the collapsed structural object. The image displaying device displays an object flash E at the collision point and erases the display element judged as colliding with the direct laser beam L.

Figure 13:
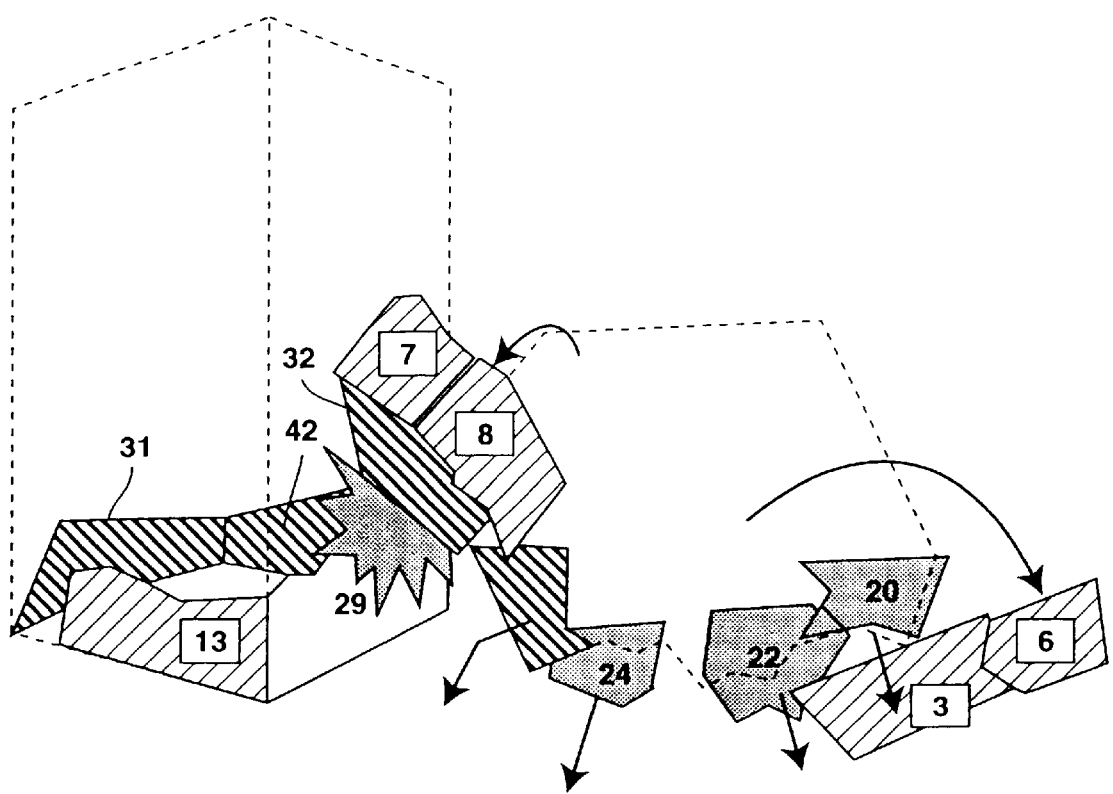
FIG. 13 is a conceptual diagram of the display during the collapse after the second attack on the building object.

FIG. 13 is an image display element of a display element, which is adjacent to the display element erased due to the impact upon laser beam irradiation, being scattered. As the size of the collision vector set at step S105 is larger than the minimum value Pmin (S111, YES), parameters for movement and rotation have been set at step S112. Here, display elements 7, 8, and 32 and display elements 3 and 6 are moving as a single clod of a display element group without being mutually separated. The block consisting of display elements 7, 8 and 32 is colliding with display elements 29 and 42 which structure the basic portion of the building remaining without collapsing. Cases like this, where the display elements collide with each other and disappear, may also occur.

Figure 14:
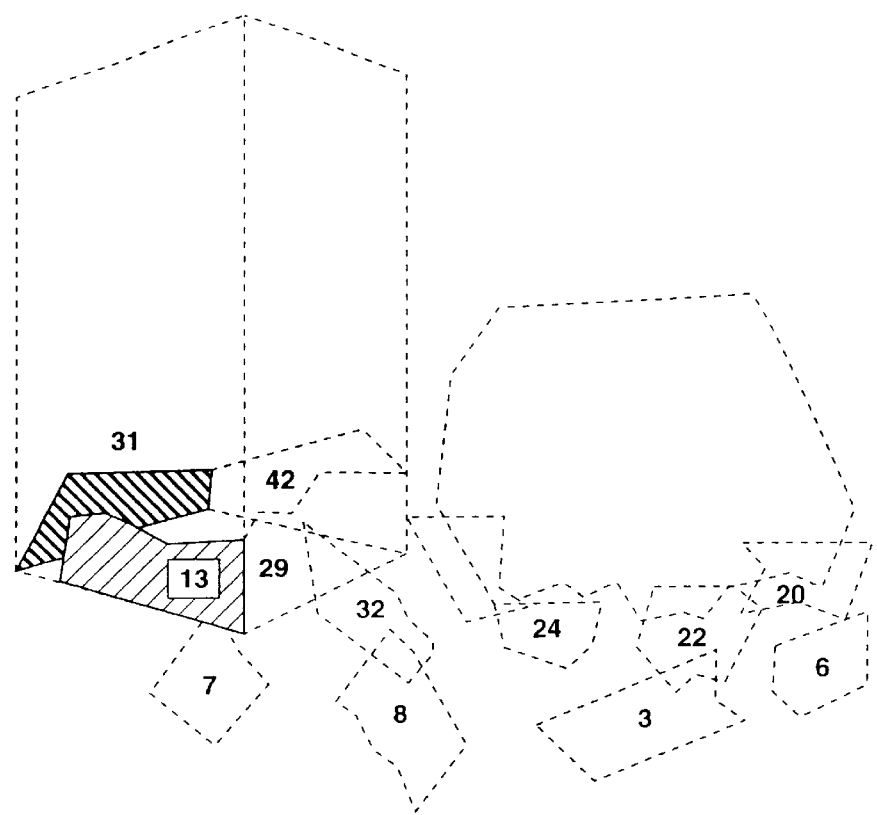
FIG. 14 is a conceptual diagram of the display upon completion of the second attack on the building object.

FIG. 14 is an image display example of the completion of the second attack. Display elements 3, 6, 7, 8, 20, 22 and 24 that have scattered and separated due to the impact of the laser beam fired from the monster are erased by hitting the ground or being separated into minimum units. Display elements 7, 8 and 32 scattered as blocks are similarly erased by directly colliding with the basic portion of the building or being separated. The remaining display elements 39, 42 structuring the basic portion of the building are also erased by the block directly colliding thereto. Like this, each of the display elements is erased under the condition of directly colliding with a character or ground or being separated. In comparison to crushing and erasing an object with only the first attack, it is possible to express a more realistic form of destruction. By employing this method, there is also an advantage that the burden on the CPU within a short period is decreased.

Figure 15:
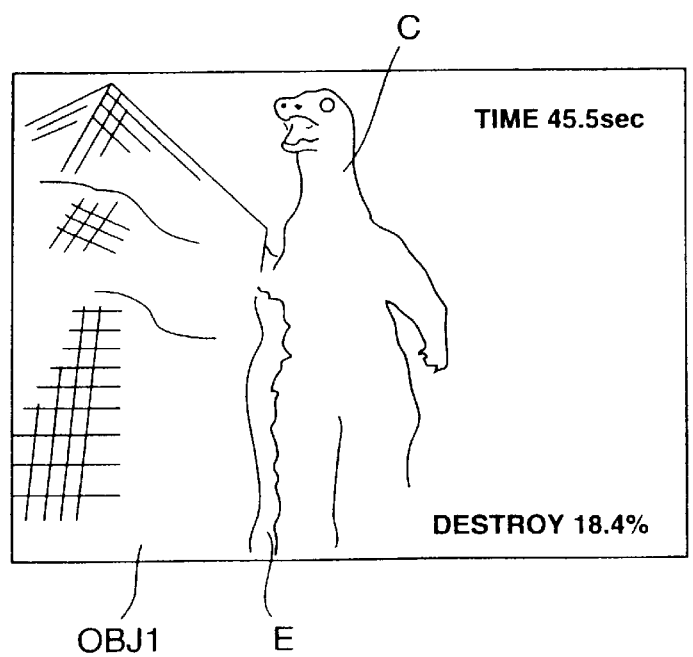
FIG. 15 is a first example of the actual display of an image in the present embodiment.

FIG. 15 is a display example a structural object and monster character in which texture mapping has been performed. By the character C contacting the structural object OBJ 1, a flash E occurs, and the structural object is broken down into a plurality of blocks and is starting to collapse. The elapsed time from the start of the game is displayed on the upper right-hand corner of the screen, and the ratio of the object destroyed in comparison to the overall object is displayed on the lower right-hand corner of the screen.

Figure 16:
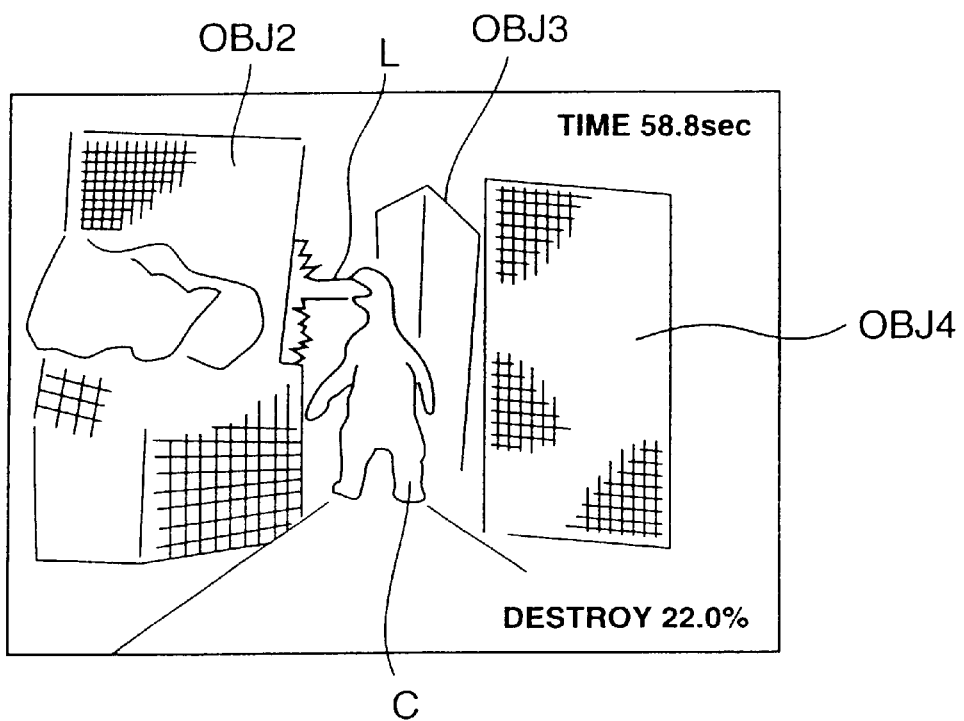
FIG. 16 is a second example of the actual display of an image in the present embodiment.

FIG. 16 shows a display example of other structural objects and monster characters. The object OBJ 2 is being destroyed by the laser beam L fired from the character C. Objects OBJ 3 and OBJ 4 are intact.

Area-Out Processing

Next, the area-out processing in the present embodiment is explained. The present game device performs area-out processing when a monster exceeds a prescribed movable range. This is because if the monster may freely move without any restrictions, a prescribed number of objects will deviate from the set range.

Figure 4:
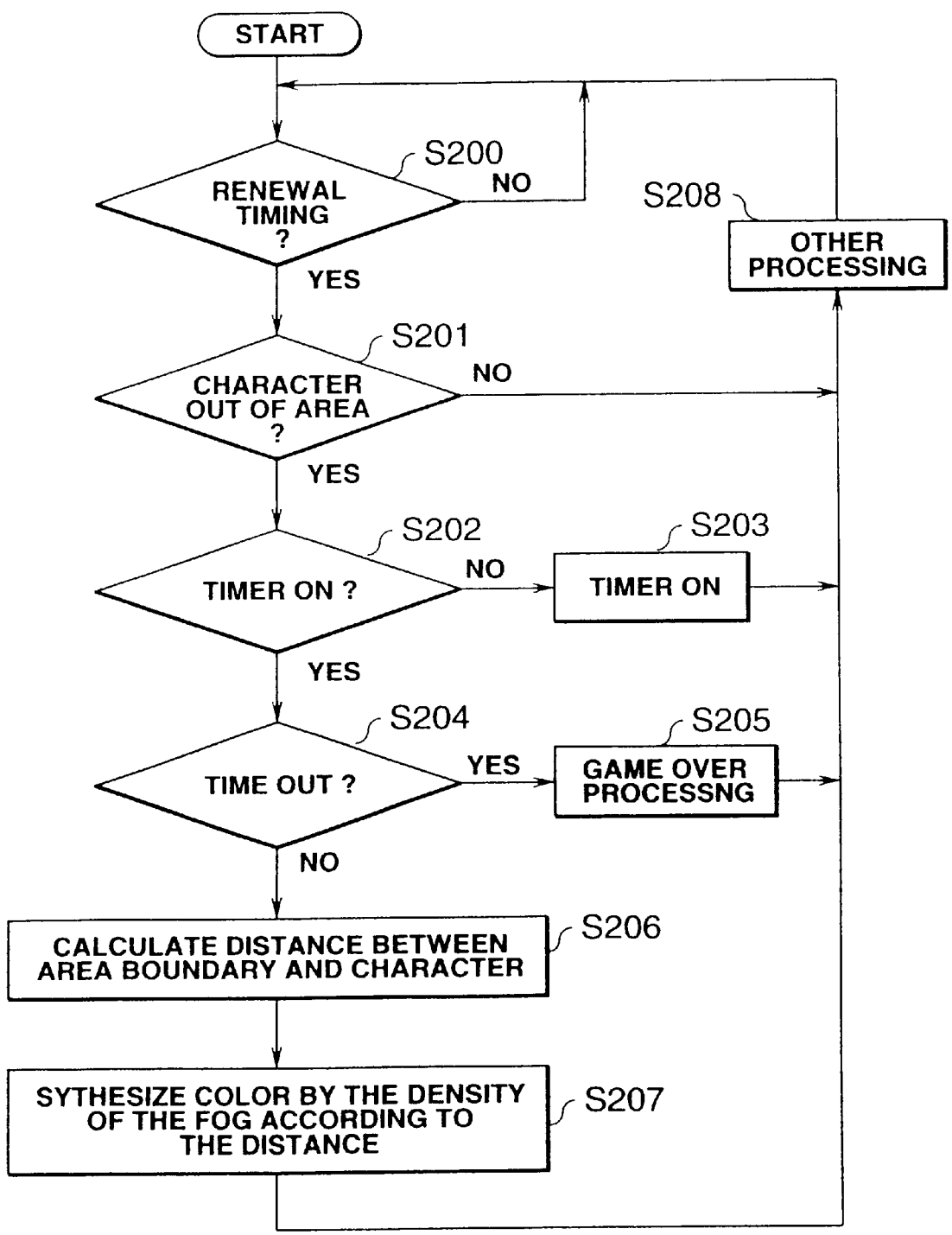
FIG. 4 is a flowchart explaining the area-out processing in the present embodiments.
Figure 17:
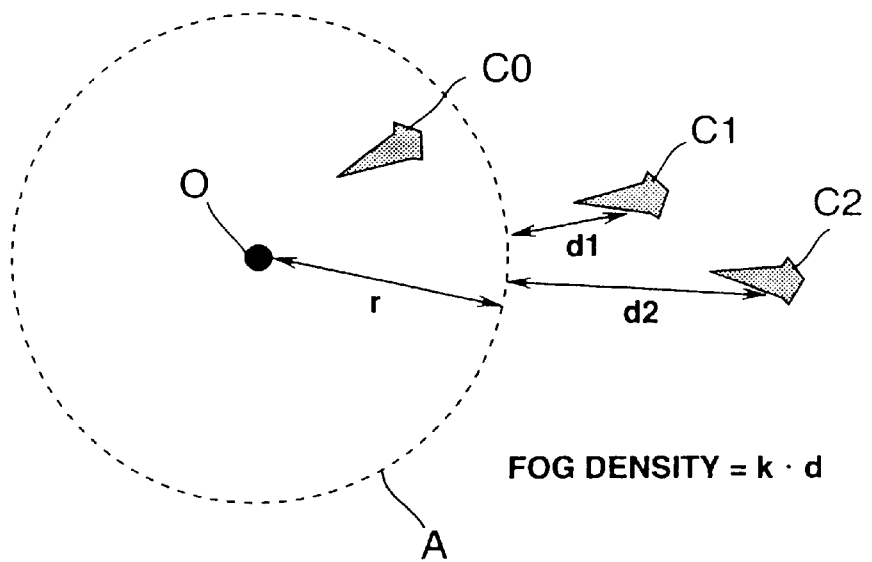
FIG. 17 is a diagram of the position relationship explaining the area-out processing of a character.

FIG. 17 shows a plane conceptual view in the virtual space for explaining this area-out processing. An area A with a radius r is set in the center position O of the game. The monster C0 is within this area. Monsters C1 and C2 are out of this area. The viewpoint position within the virtual space capable of capturing the monster is set in a position relationship relative to the monster. The viewpoint is set in accordance with the position of the monster in the world-coordinate system. When the monster goes out of this area A, the viewpoint is set to a position to capture the monster from behind. This is in order to give an impression that the monster is receding from view. In such case, fog processing is performed in the present embodiment based on the flowchart of FIG. 4. While the monster is receding from view, an impression of it disappearing into the fog is given. This is in order to hide the scenery outside the area because, if no objects are set and displayed as is, such scenery will be bleak and unnatural.

Figure 18:
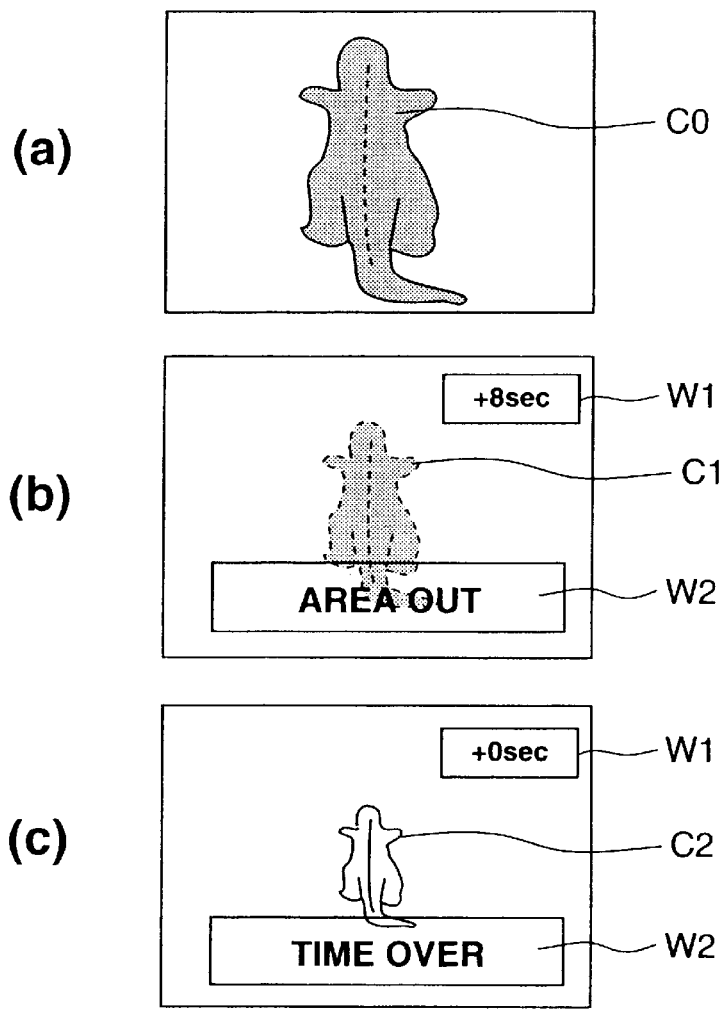
FIG. 18 is a conceptual diagram of the display of the area-out processing.

First, the renewal timing is awaited (S200, NO), and when it is the renewal timing (S200, YES), judgment is made as to whether the character is inside or outside the area by referring to the center coordinates of the character. If the character is within the area (S201, NO) transition is made to another processing (S208). A picture of a standard monster C0 is displayed on the screen in such a case as shown in FIG. 18 (a). Contrarily, if the character is outside the area (S202, NO), transition is made to the area-out processing.

If the time is not yet running (S202, NO), the CPU block turns on the internal timer (S203). This timer is used for the countdown of the area-out. If the timer is running (S202, YES), judgment is made as to whether it is time out. If not time out (S204, NO), the distance between the boundary of area A and the character is calculated (S206). Then, the degree of brightness and color to be added to the character's bitmap data in correspondence with the calculated distance is set, and addition of bitmap data is performed (S207). It is preferable to also set and add the degree of brightness and color in correspondence with the distance from the area boundary with respect to objects other than characters outside the area. According to this processing, if the distance from the area A in FIG. 17 is d1, the image including the character C1 is shown as in FIG. 18 (b). In comparison to FIG. 18 (a), the degree of brightness and color has been changed, and the character becomes dim and fades into the fog. The farther the distance between the area A and the character, the stronger the displayed dimness. Window W1 on the screen displays the remaining time in correspondence with the timer value. Characters for notifying the area-out is displayed on window W2. When time out (S204, YES), game over processing is performed (S205). For example, the picture when it becomes time over at the position of the character C2 in FIG. 17 will be displayed as in FIG. 18 (c). The outline of the character is further dimmed. The remaining time displayed in window W1 becomes zero, and a character display of time over is displayed on window W2. The processing for placing fog on the character may be set by, in addition to controlling the software, setting the overall degree of brightness and color to automatically increase in a density corresponding to the parameter provided by the hardware. Especially, if structured such that the synthesis of the bitmap is performed in accordance with the distance between the character and the viewpoint, a display wherein a distant character is completely hidden in the fog and a near character is dimmed in accordance with its distance is possible.

Damage Processing

Figure 5:
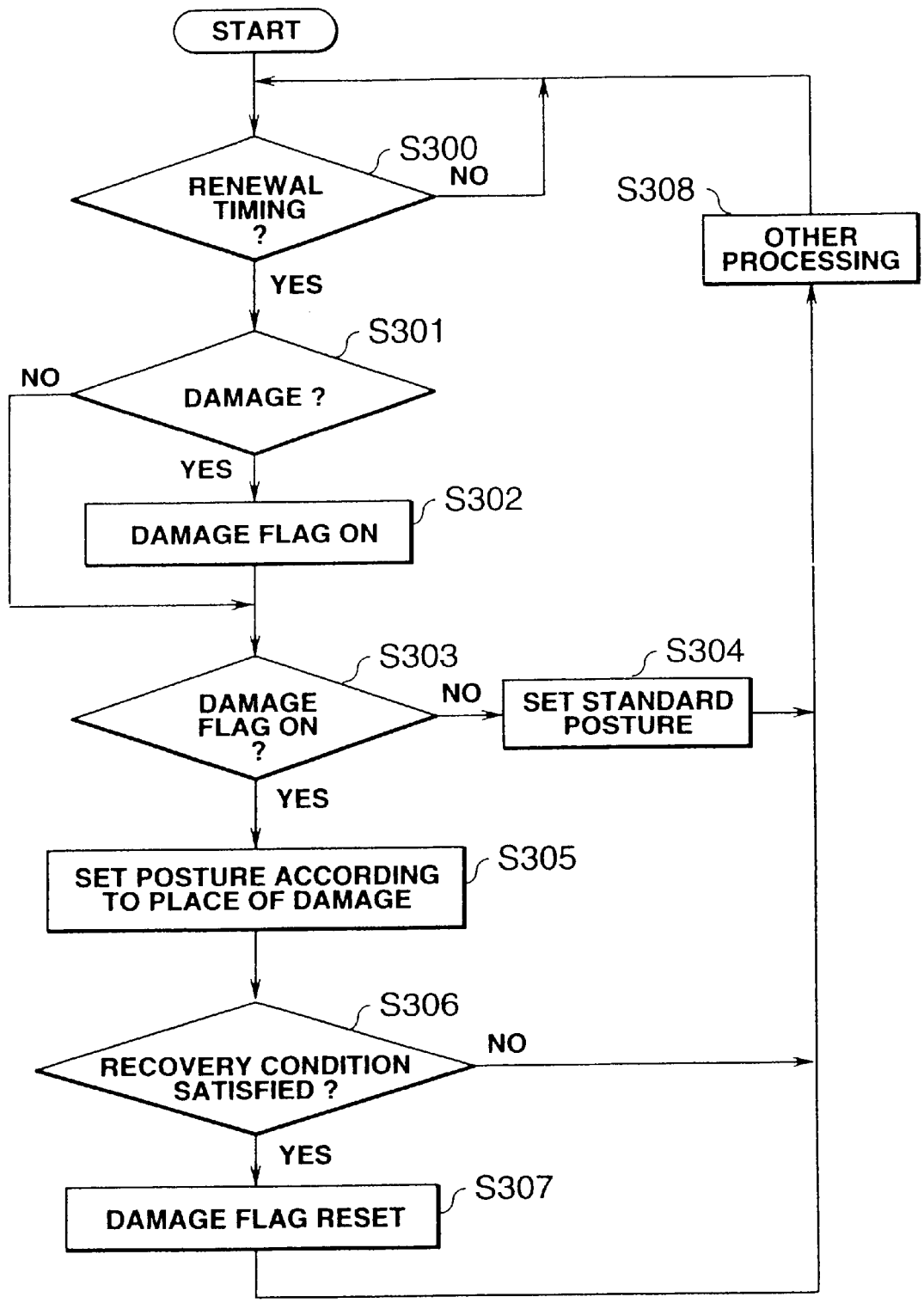
FIG. 5 is a flowchart explaining the damage processing in the present embodiment.

Next, damage processing of the present embodiment is explained. In conventional games when the character was attacked, a picture of either the character suddenly collapsing or no change at all was displayed. When the character is a large monster as in the present embodiment, however, it is unnatural if such monster were to be easily defeated. The character being absolutely invulnerable will also lower the amusement of the game. The present game device therefore performs damage processing when the character is attacked and displays the injured character. A flowchart for explaining this damage processing is shown in FIG. 5.

Figure 19:
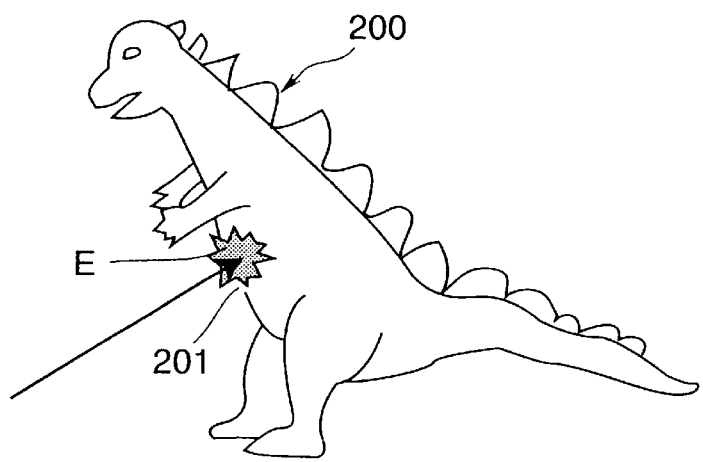
FIG. 19 is a conceptual diagram of the display of the character at the moment it is damaged.

The renewal timing of the image is foremost awaited (S300, NO), and when it is the renewal timing (S300, YES), judgment is made as to whether the character is damaged or not (S301). Whether the character is damaged or not may be judged by the collision judgment between, for example, a bullet object and character. The damage flag is turned on (S302) only when the character sustains a new damage (S301, YES). A message indicating the damage, and position data showing the damaged portion or polygon specifying data are stored in the damage flag. A damage flag is generated for each new damage. When a cannonball hits the abdominal region 201 of the character 200, for example, a flash E is displayed as shown in FIG. 19.

Figure 20:
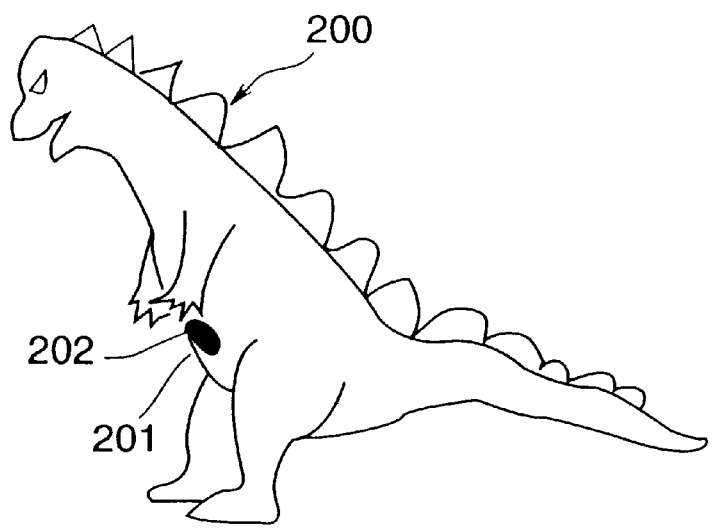
FIG. 20 is a conceptual diagram of the display of the character while it is sustaining damage.

The CPU block then sets the character's posture in accordance with the existence of the damage flag. If the damage flag is no on (S303, NO), set is the posture which is ordinarily set (S304). Contrarily, if the damage flag is on (S303, YES), the CPU block displays the character's posture according to the damaged portion (S305). As shown in FIG. 20, for example, displayed in an object 202 with blood dripping from the abdominal region 201. The position of each of the polygons structuring the character 200 is adjusted such that the character is in a posture of protecting such abdominal region.

The CPU block further judges whether a recovery condition has been fulfilled (S306). Recovery conditions are optionally set conditions. Specifically, when a character conducts a prescribed act, the act of "regaining energy by eating" for example, the recovery condition is fulfilled. A recovery condition may also be fulfilled upon a prescribed period of time elapsing from the time of sustaining damage. In other words, an image of a creature recovering from the damage is displayed. If the recovery condition is not fulfilled (S306, NO), transition is made to another processing (S308) and an image of the posture of the damaged character is continued to be displayed. On the other hand, if the recovery condition is fulfilled (S306, YES), the CPU block resets the damage flag (S307). The character is then displayed in the standard posture from the next image renewal period. If sustaining a plurality of damages, however, and a damage flag is remaining, an image of the posture of the damaged character is maintained.

Evaluation Processing

Figure 21:
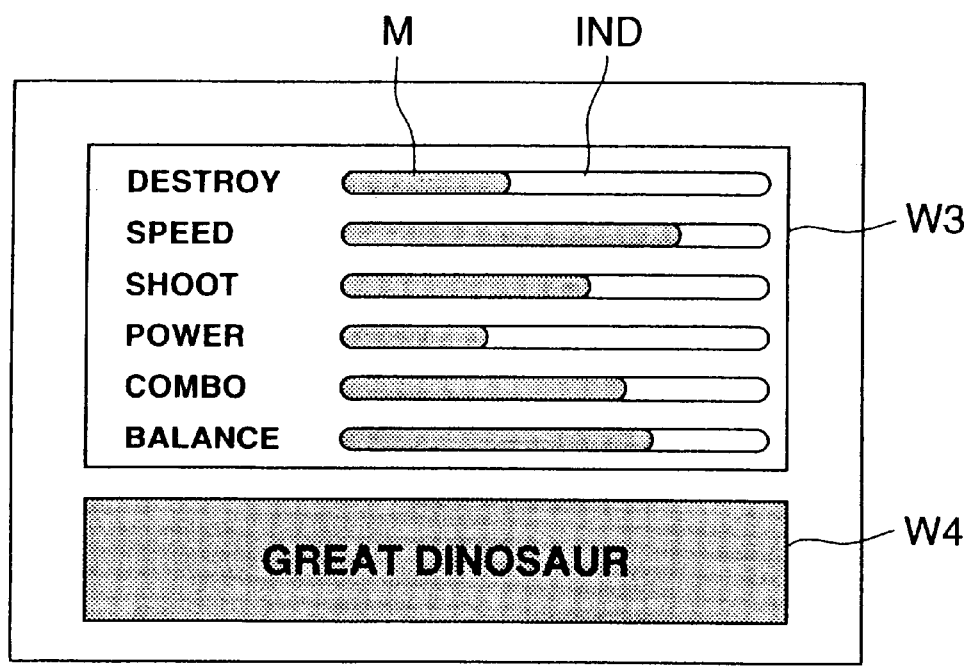
FIG. 21 is a display example of the evaluation image in the present embodiment.

When it is game over, the CPU block displays a screen as shown in FIG. 21 and evaluates the game content. In window W3, a plurality of indicators IND for evaluating the player's operation technique are displayed classified by categories. Window W4 is a column for displaying characters representing the character's title given as the overall evaluation.

With respect to the evaluation per category in Window W3, the "DESTROY" column displays the percentage with index M of the number of polygons destroyed in consideration of the destructible number of polygons of the object set at 100. The "SPEED" column displays the percentage in index M of the ratio of the time required to clear the game in consideration of the time limit in the game (5 minutes for example) set at 100. The "SHOOT" column displays the percentage in index M of the number of enemies destroyed upon clearing the game in consideration of the number of enemies appearing during the game (fighter planes for example) set at 100. The "POWER" column displays the percentage in index M of the power value upon clearing the game in consideration of the maximum power of the monster character set at 100. The "COMBO" column evaluates the consecutive attacks made by the player. That is, the display elements constituting the structural object are divided into a certain number of blocks. When an attack is made to the object, these blocks are erased and dropped in block units. When a block starts falling due to the first attack, it is possible to conduct a second attack to such block. The "COMBO" column displays the percentage in index M of the number of blocks destroyed by consecutive attacks in consideration of the number of overall blocks set at 100. The "BALANCE" column evaluates the maneuver balance of the character. That is, upon attacking the blocks constituting the structural object, the CPU block records the "maneuver" required for the destruction thereof. Examples of "maneuvers" include tail attack, hand attack, laser beams, etc. With a premise that it is preferable to destroy the object with well-balanced "maneuvers," the CPU block records the destruction number of the block per maneuver. The "BALANCE" column displays the percentage in index M of the balance evaluation upon clearing the game by comparing the difference in the destruction ratio of the blocks destroyed pursuant to each of the maneuvers and the standard value.

The title in window W4 is determined pursuant to the overall ratio of the evaluation of the six categories upon respectively evaluating and obtaining the results of the aforementioned six categories. Several titles are predetermined corresponding thereto in the order from a high evaluation to a low evaluation. The CPU block obtains the overall percentage based on these six categories, reads a title corresponding thereto, and displays the same on window W4.

(Advantages)

There are the following advantages according to the present embodiment as mentioned above:

1) According to the present embodiment, as the structural object is constituted of block-shaped display elements after a collapse, a display of a realistic collapse of a building is possible by merely separating the object per display element.

2) According to the present embodiment, as the outline of each display element is set to simulate a block clod created upon an actual collapse of a building, a display of a realistic collapse of a building is possible.

3) According to the present embodiment, as a display element is erased upon colliding with a character or the ground, it is possible to display a realistic scene of a part of the building being destroyed or the crushed block disappearing.

4) According to the present embodiment, as a display element directly above the erased display element is dropped, it is possible to display a realistic collapse of a building with a time lag as when a building is destroyed in a monster movie.

5) According to the present embodiment, when a display element is erased, a display element adjacent thereto is moved at a speed according to the intensity of impact and a display of an image where a display element is scattered far in accordance with the intensity of impact is possible.

6) According to the present embodiment, when a display element is erased, a display element adjacent thereto is moved toward a direction according to the direction of impact and a display of an image where a display element is scattered in a direction in accordance with the direction of impact is possible.

7) According to the present embodiment, when a display element is erased, a display element adjacent thereto is rotated at a rotation speed according to the size of the display element and a display simulating a rotation of the block conforming to the laws of nature is possible.

8) According to the present embodiment, when the intensity of impact exceeding a prescribed value is inflicted upon an object, the display position of an adjacent display element is changed. Thus, it is possible to realistically display a building immediately before collapsing wherein such building is barely supported by a partial pillar.

9) According to the present embodiment, when a display element is erased and the remaining display elements are barely being supported, the blocks on top of the supporting display elements are collectively dropped when the number of such supporting display elements is less than a prescribed number. It is therefore possible to display a realistic picture of the building collapsing.

10) According to the present embodiment, as the remaining object after the collapse is also structured to be destructible as another separate object, a further realistic image is provided. For example, it is possible to provide a realistic image where a monster further tramples over a part of a collapsed building just like in a monster movie. Another advantage is that less burden is placed on processing in comparison to a building being crushed with only the first collapse.

11) According to the present embodiment, the blocks after a collapse may be erased naturally as the display elements separated in minimum units are erased. In other words, the blocks erased from the screen are inconspicuous if they are in minimum units, and an unnaturalness of an object suddenly disappearing will not be conveyed to the player. A character may also use a part of the object not separated into minimum units after a collapse as a weapon (stone-throwing for example). A part of the object which became this weapon will collide with other characters, be separated into minimum units, and disappear. A new game processing method is provided wherein a character may be supplied with a weapon without unnecessarily increasing the number of usable weapons in the game.

12) According to the present embodiment, when a character goes out of the area, an image of a fog is displayed, and an unnecessary display outside the area may be naturally avoided. By gradually displaying the character such that it recedes from view, it is possible to naturally inform the player of the movable range of the character.

13) According to the present embodiment, as the density of the fog is changed in accordance with the distance between the character and the area boundary, it is possible to display a natural image of the fog becoming denser while the character is receding from view.

14) According to the present embodiment, as time out processing is performed while the character is outside the area, it is possible to end the game naturally in the fog.

15) According to the present embodiment, when it is judged that a character collided with another object, the character's posture is changed until the recovery condition is fulfilled, and it is therefore possible to naturally display an image of a character as though it has sustained damage.

16) According to the present embodiment, as the posture is set such that the character protects the place of collision, it is possible to display a creature's instinctive actions.

17) According to the present embodiment, as a character is made to recover by conducting predetermined movements, it is possible to display a creature's instinctive actions such as recovering by supplementing energy.

18) According to the present embodiment, as a character is made to recover by a predetermined period of time elapsing, it is possible to display a creature's instinctive actions such as recovering with the lapse in time.

19) According to the present embodiment, as consecutive attacks are evaluated in COMBO, it is possible to provide a worthy game to advanced players who are capable of conducting consecutive attacks.

20) According to the present embodiment, as maneuver balance is evaluated in BALANCE, it is possible to provide a worthy game to advanced players who are capable of combining several maneuvers.

21) According to the present embodiment, as a title is given as the overall evaluation, it is possible to provide a continuously appealing game by showing a target evaluation (title) to the player.

(Other Examples)

The present invention is not limited to the embodiment above but may also be employed upon being changed within the scope of the purport of the present invention. Display elements of the present invention, for example, may also be employed to objects other than structural objects. For example, display elements may also be employed to objects representing characters or natural objects such as mountains.

The method of erasing and dropping the display elements is not limited to the above, and is employable upon various changes in planning. The combination of blocks as display element groups can also be set optionally.

According to the present invention, it is possible to realistically collapse a building by structuring objects such as buildings with blocks to be collapsed.

According to the present invention, it is possible to naturally restrict the movable range of the character by displaying a picture where the character is covered with fog in accordance with the moving position.

According to the present invention, it is possible to realistically represent the degree of damage to the character by structuring the posture of the damaged character to be changeable.

We claim:

1. An image processing device for displaying a moving image, comprising:
　　a setting device for setting in advance a plurality of display blocks to be scattered after a collapse of a first object as collective movable display elements;
　　a structuring device for structuring a second object with said display elements; and
　　a displaying device for displaying said second object.

2. An image processing device according to claim 1, wherein said display elements are set to shapes simulating block clods created upon an actual collapse of a building.

3. An image processing device according to claim 1, wherein when each of said display elements approaches a specific object within a predetermined distance, such display element is erased.

4. An image processing device according to claim 1, wherein when a certain display element is erased, an image of a display element positioned directly thereabove falling at a prescribed speed is displayed.

5. An image processing device according to claim 1, wherein when a certain display element is erased, an image of a display element adjacent thereto moving at a speed in accordance with the intensity of the impact inflicted upon the object is displayed.

6. An image processing device according to claim 1, wherein when a certain display element is erased, an image of a display element adjacent thereto moving in a direction in accordance with the direction of the impact inflicted upon the object is displayed.

7. An image processing device according to claim 1, wherein when a certain display element is erased, an image of a display element adjacent thereto rotating at a rotation speed in accordance with the size of said display element is displayed.

8. An image processing device according to any one of claims 5 to 7, wherein when the intensity of the impact inflicted upon the object exceeds a prescribed value, the display position of the image of the display element adjacent to the erased display element is changed.

9. An image processing device according to claim 1, wherein when a certain display element is erased and therefore the remaining display elements are arranged in a horizontal row and supporting the object in a virtual space, and when the number of supporting display elements are less than a prescribed number, an image of these display elements and/or the display elements supported thereby falling at a prescribed speed is displayed.

10. An image processing device according to claims 1, 2, 3, 4, 5, 6, 7 or 9, wherein when another impact is to be inflicted upon part of said object remaining without being erased during or after the fall, a display element structuring a part of said object is further erased, moved, or rotated.

11. An image processing device according to claim 10, wherein when the display elements structuring said object are separated with the whole or part thereof remaining upon the infliction of an impact, these display elements are erased.

12. An image processing device capable of displaying a movable character within a virtual space;
    wherein when said character goes out of the area set in the virtual space, said image processing device displays a uniformly changing image of the degree of brightness and/or color of the picture element displaying the character.

13. An image processing device according to claim 12, wherein the degree of brightness and/or color of said picture element is changed in accordance with the distance between the character and the boundary of said area.

14. An image processing device according to claim 12 capable of performing completion processing when the time in which said character is out of said area reaches a prescribed time.

15. An image processing device capable of displaying a movable character in a virtual space;
    wherein when it is determined that a character collided with another object, said image processing device displays an image of a change in said character's posture until a prescribed condition is fulfilled.

16. An image processing device according to claim 15, wherein said character's posture is a posture which protects the point of collision.

17. An image processing device according to claim 15, wherein said prescribed condition is said character making a predetermined motion.

18. An image processing device according to claim 15, wherein said prescribed condition is the lapse of said predetermined time.

19. An image processing method for displaying a moving image, comprising the steps of:
    setting in advance a plurality of display blocks to be scattered after a collapse of a first object as collective movable display elements;
    structuring a second object with said display elements; and
    displaying said second object.

20. An image processing method capable of displaying a movable character within a virtual space comprising the steps of:
    determining whether or not the character has gone out of the area set in the virtual space; and
    displaying a uniformly changing image of the degree of brightness and/or color of the picture element displaying the character when said character goes out of the area set in the virtual space.

21. An image processing method capable of displaying a movable character within a virtual space comprising the steps of:
    determining whether or not the character collided with another object;
    determining whether or not a prescribed condition has been fulfilled when it is determined that said character has collided with another object; and
    displaying an image of a change in said character's posture when said condition is not fulfilled.

22. A machine-readable recording medium storing a program for making a computer execute the image processing method according to any one of claims 19 to 21.

* * * * *